United States Patent [19]

Brown

[11] Patent Number: 4,622,139
[45] Date of Patent: Nov. 11, 1986

[54] AERATOR DEVICE

[76] Inventor: Charles J. Brown, 4877 Woodland Cir., Tallahassee, Fla. 32303

[21] Appl. No.: 714,118

[22] Filed: Mar. 20, 1985

[51] Int. Cl.$^4$ ............................................. C02F 7/00
[52] U.S. Cl. .................................. 210/170; 210/220; 261/122
[58] Field of Search ................................. 261/122–124, 261/DIG. 70, 121 R; 210/220, 170

[56] References Cited

U.S. PATENT DOCUMENTS

| | | |
|---|---|---|
| 3,520,416 | 7/1970 | Keedwell ......................... 261/122 X |
| 3,941,862 | 3/1976 | Price et al. ........................... 261/122 |
| 4,048,072 | 9/1977 | McCullough ................... 261/122 X |

Primary Examiner—Tom Wyse
Attorney, Agent, or Firm—Duckworth, Allen & Dyer

[57] ABSTRACT

An aeration/mixing apparatus for a water body has a centrally located circular manifold and a plurality of evenly spaced, peripherally located air output connectors is positioned over a base plate. The manifold is supported a fixed distance above the plate and a plurality of microporous diffuser tubes inserted in the output connectors. The plate is at least coextensive with the tubes. The apparatus is placed in the bottom sediment of a water body and air supplied to the manifold. Air escaping from the diffuser tubes creates an upwelling convection current which mixes oxygen in the water by direct contact with the air. The base plate isolates the turbulent water at the diffuser assembly from the loose bottom sediment thereby preventing stirring of such sediments and concomitent resuspension of oxygen depleting nutrients into the water.

14 Claims, 3 Drawing Figures

AERATOR DEVICE

BACKGROUND OF THE INVENTION

1. Field of the Invention

This invention relates to aeration of liquids and, more particularly, to an improved aeration/mixing apparatus.

2. Description of the Prior Art

Aeration devices are employed in stagnant or polluted bodies of water to promote oxygenation for aquatic life and to assist in the decomposition of pollutants. The principal purpose of the aeration device is to bring air into contact with water over as large an interface as possible in order to promote the rapid transfer of oxygen to the water. In an aeration/mixture system, air is injected through a diffuser under water and allowed to bubble to the surface creating an upwelling current. The transfer of oxygen depends upon bubble size and upon maintaining a constant flow of oxygen-depleted water to the diffuser system. Bubble size depends upon air pressure used to inject air into the liquid and upon the size of the orifice through which the air is allowed to escape. Mathematically it can be shown that the smaller the bubble-for a given rate of air injection—the more area of air to liquid interface exists, thus enhancing the oxygen transfer. A description of various prior art aeration techniques is given in U.S. Pat. No. 4,272,461. As pointed out therein, one of the prior art problems is that gas bubbles, even if small when introduced into the liquid, tend to aggregate into large bubbles as they rise, thus reducing the effective gas-to-liquid interface area.

A further problem with other prior art diffusion-type aerators is that they have been essentially placed in a position of rest on the loose sedimentary material at the bottom of a waterbody. The aeration conducted using such arrangements tends to stir up and resuspend the loose sediments including organic matter which tend to use the oxygen newly dissolved in the water. Nutrients in the bottom sediments are thus re-suspended in the water column defeating the purpose of aeration.

A number of prior art patents have disclosed apparatus to avoid stirring bottom sediment. Typical among these are U.S. Pat. No. 4,107,240 to Verner et al.; U.S. Pat. No. 3,956,432 to Hilling and U.S. Pat. No. 3,799,511 to Svantessoi. Other patents are more directed toward generating turbulent conditions. Illustrative of this latter group are U.S. Pat. No. 4,210,613 to Webb; U.S. Pat. No. 3,679,187 to Smith and U.S. Pat. No. 4,421,696 to Grave et al.

SUMMARY OF THE INVENTION

It is an object of the present invention to provide an improved aeration/mixing apparatus.

It is another object of the present invention to provide a aeration/mixing apparatus which generates small bubbles.

It is still another object of the present invention to provide a aeration/mixing apparatus which does not stir bottom sediments.

In accordance with the present invention, there is provided a aeration/mixing apparatus having a substantially flat, circular manifold with a centrally located air input connector and a plurality of evenly spaced, peripherally located air output connectors. The manifold is supported a predetermined distance above and centrally of a solid, flat base plate. A plurality of microporous diffusion tubes, each having an open end and a closed end, are connected by their respective open ends to a corresponding one of the output connectors of the manifold to thus radically extend from the central manifold. The number of tubes and their individual length is set to assure close proximity between tubes.

In operation, the apparatus is placed on the bottom of a pond, lake, or estuary and air injected into the manifold at a controlled, predetermined pressure. The air flows into the diffusion tubes and is injected into the liquid through 20 micronsize holes in the tubes. The close proximity between tubes creates a turbulent, or upwelling, flow which pulls liquid into the aeration apparatus from the lower stratum or hypolimnion of the waterbody so that a constant flow of oxygen-depleted liquid is fed to the aerator.

BRIEF DESCRIPTION OF THE DRAWINGS

The novel features believed characteristic of this invention are set forth in particularly in the appended claims. The invention itself, however, both as to its organization and method of operation, together with with further objects and advantages thereof, can best be understood by referring to the following description taken in conjunction with the accompanying drawing, wherein:

DETAILED DESCRIPTION OF THE PREFERRED EMBODIMENT

Figure 1:
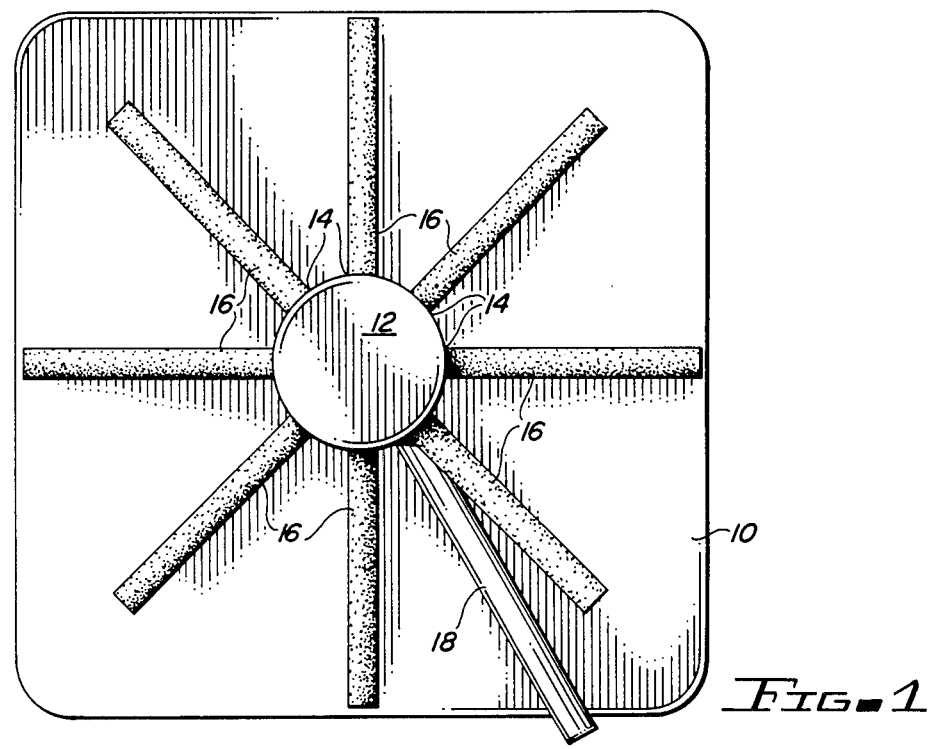
FIG. 1 is a top planar view of the inventive aeration/mixing apparatus.

Referring now to FIG. 1, the aeration/mixing apparatus comprises a base plate 10 above which is centrally located a manifold 12. The manifold 12 has a central air input connector on its lower side (which can be seen in FIGS. 2 and 3) and a plurality of evenly spaced output connector ports 14 into which are inserted a corresponding plurality of diffuser tubes 16. An air input line 18 is connected to the air input connector of manifold 12.

Figure 2:
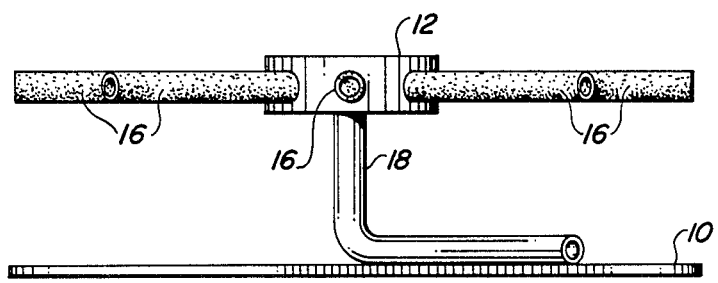
FIG. 2 is a side planar view of the present invention illustrating displacement from a base plate.

With reference to FIG. 2, the manifold 12 is shown supported above base plate 10 by use of a rigid air input line 18 which is bent at a right angle and has a portion thereof attached to base plate 10. If line 18 is metallic, the attachment to a metallic base plate 10 may be by brazing or welding. Alternatively, the manifold 12 may be supported by other dedicated support (not shown) and the attachment to plate 10 by means well known in the art. The manifold 12 can be seen to be in the form of a substantially flat plate-like member. Preferrably, the manifold 12 is supported such that the tubes 16 are nominally 6 inches above base plate 10.

Figure 3:
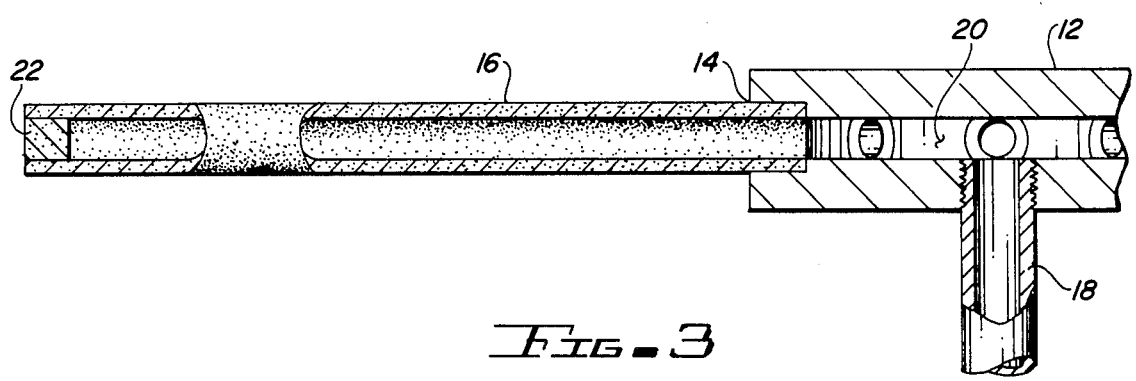
FIG. 3 is a cross-sectional view of a manifold and microporous diffuser tube used in the present invention.

As shown in FIG. 3, manifold 12 is constructed with a central cavity 20. Each of the tubes 16 connect to the cavity 20 as does the air input line 18. The manifold 12 may be produced from any suitable rigid material such as, for example, PVC or aluminum.

Each of the microporous diffuser tubes 16 are constructed of a polyethylene co-polymer having 20 micron nominal porosity. In a preferred embodiment, the tubes 16 were obtained from General Polymeric Corporation as 0.850 inch OD×0.5 inch ID×15 inch diffuser assembly. The length of the tube 16 exposed to liquid is reduced to a nominal 7 inches by cutting the 15 inch tubes in half. A plug 22 is glued into one end of each tube 16 and the open end glued into manifold 12 leaving approximately 7 inches exposed.

The most advantageous length of tube 16 was determined empirically to be 7 inches, although values between 6 and 8 inches can be used. This dimension provides high bubble density with a low pressure differential between air inside the tube and water outside. Below this dimension, pressure differential for the necessary flow rate creates too large an air bubble. For larger dimensions, the distance between adjacent tubes 16 becomes too far to generate the required upward convection current. This upwelling convection current appears to be forced by friction of the water between bubbles. With 7 inch tubes, the manifold 12 is built with a 4-inch diameter and base plate 10 is an 18-inch square. However, the base plate 10 may be any shape or size so long as it is co-extensive with tubes 16 or larger.

In operation, clean oil-free air is supplied through air line 18 to manifold 12. The central manifold 12 permits the same amount of air to be distributed to each diffuser tube 16 where it is expelled through the 20 micron size holes as tiny bubbles approximately 1/16 inch in diameter. This inventive aerator configuration generates a large number of bubbles per volume of water whereby adjacent bubbles trap surrounding water thereby raising it along their path and creating an upward swelling convection current.

Along the bottom of the pond, a laminar flow of water is established toward the diffuser. The velocity of the laminar flow is sufficiently slow that bottom sediments are not disturbed. Close to the diffuser where water velocity could be sufficient to disturb sediments, the base plate 10 protects the loose sediment. Directly below the diffuser tubes 16, the direction of water flow changes from horizontal to upwelling and from laminar to turbulent. The turbulent motion of the bubbles traps water and mixes it thus enhancing the oxygen transfer. At the surface, the raised water spreads out in a thin sheet furthering its contact with air.

Aeration thus occurs by direct contact with the bubbles and by contact with the atmosphere at the surface. Gasses—such as methane, ammonia and hydrogen sulfide, which are waste-products of anaerobic bacteria in the bottom sediment—are released to the atmosphere at the surface. The mixing action of the rising water reduces thermal stratification which often results in stagnation. In estuaries where salinity stratification occurs due to differences in density between salt and fresh water, the mixing action may break apart such stratification.

While the principles of the invention have now been made clear in an illustrative embodiment, there will become apparent to those skilled in the art many modifications in structure, arrangement, elements and materials without departing from those principles. The appended claims are therefore intended to cover and embrace any such modifications within the limits only of the true spirit and scope of the invention.

I claim:

1. Apparatus for aerating a liquid comprising:
   a manifold having an input connector for receiving positive pressure air and a plurality of output connectors for even distribution of the air, said manifold comprising a substantially flat plate-like assembly having said output connectors uniformly distributed about a periphery thereof;
   a plurality of rigid elongated diffuser tubes, each having an open end and a closed end, the open end of each tube being connected to a corresponding one of the output connectors of said manifold, said tubes being arranged and dimensioned to create an upwelling turbulent flow without downward flow in an area coextensive with said tubes;
   a base plate; and
   support means connected to said base plate and said manifold for positioning said manifold a predetermined distance from said base plate, said distance being selected such that laminar liquid flow entering an area between said diffuser tubes and said base plate is not turbulent.

2. The apparatus of claim 1 wherein said manifold is oriented such that said diffuser tubes are substantially planar to said base plate.

3. The apparatus of claim 2 wherein the length of said diffuser tubes is coextensive with the width of said base plate.

4. The apparatus of claim 1 or 3 wherein said diffuser tubes are between 6 and 8 inches.

5. The apparatus of claim 4 wherein said diffuser tubes comprise microporous polyethylene co-polymer.

6. The apparatus of claim 4 wherein the length of each of said diffuser tubes is approximately 7 inches.

7. The apparatus of claim 1 wherein said support means comprises a substantially rigid gas supply line having one end connected to said manifold input connector and a portion thereof firmly attached to said base plate.

8. In a body of water having substantial loose bottom sediment, apparatus for rapidly introducing dissolved oxygen into the water by direct air contact without disturbing the sediment, the apparatus comprising:
   a base plate;
   a substantially flat plate-like manifold having a centrally located air input connector and a plurality of peripherally located, evenly spaced air output connectors;
   a plurality of rigid microporous diffuser tubes, each having an open end and a closed end, the open end of each tube being connected to a corresponding one of the output connectors of said manifold; and
   means for supporting said manifold a predetermined distance above said base plate whereby positioning said base plate upon the sediment within the water maintains said diffuser tubes above the sediment level.

9. The apparatus of claim 8 wherein said diffuser tubes are smaller or coterminous with said base plate.

10. The apparatus of claim 8 wherein said plurality of tubes includes at least eight.

11. The apparatus of claim 8 wherein said tubes are spaced such that air bubbles emitted by each tube cooperate with air bubbles emitted from adjacent tubes to create an upward convection current.

12. The apparatus of claim 11 wherein said tubes are approximately 7 inches in length.

13. The apparatus of claim 12 wherein said tubes comprise a polyethylene co-polymer.

14. The apparatus of claim 13 wherein said supporting means comprises a substantially rigid air supply line having one end connected to said manifold input terminal and a portion thereof firmly attached to said base plate.

* * * * *